(12) United States Patent
Zhang et al.

(10) Patent No.: US 8,996,310 B1
(45) Date of Patent: Mar. 31, 2015

(54) VEHICLE HEADING VALIDATION USING INERTIAL MEASUREMENT UNIT

(75) Inventors: Qiyue Zhang, Cupertino, CA (US);
Darren S. Liccardo, San Jose, CA (US);
Anthony Malerich, Santa Clara, CA (US)

(73) Assignee: Moog, Inc., East Aurora, NY (US)

( * ) Notice: Subject to any disclaimer, the term of this patent is extended or adjusted under 35 U.S.C. 154(b) by 309 days.

(21) Appl. No.: 13/415,607

(22) Filed: Mar. 8, 2012

(51) Int. Cl.
*G01S 19/48* (2010.01)
*G01C 21/16* (2006.01)

(52) U.S. Cl.
CPC .................... *G01C 21/165* (2013.01)
USPC ......................................... 701/472

(58) Field of Classification Search
USPC ........................................ 701/472
See application file for complete search history.

(56) References Cited

U.S. PATENT DOCUMENTS 5,906,655 A * 5/1999 Fan ................................ 701/472

* cited by examiner

*Primary Examiner* — John Q Nguyen
*Assistant Examiner* — Kyung Kim
(74) *Attorney, Agent, or Firm* — Hodgson Russ LLP

(57) ABSTRACT

A navigation system repeatedly determines a GNSS heading for the vehicle based on GNSS data received from the GNSS receiver, and repeatedly determines an inertial heading for the vehicle based on data received from an inertial measurement unit. The navigation system repeatedly sets the inertial heading to a verified GNSS heading and then provides the set inertial heading as input to a recursive feedback algorithm. The recursive feedback algorithm receives additional inputs indicating the vehicle's angular displacement or acceleration and outputs an updated inertial heading. The navigation system compares the subsequently determined GNSS headings with the updated inertial heading. If the two headings are different, the navigation system sets the GNSS heading to the updated inertial or 180 degree reverse of the GNSS heading.

20 Claims, 4 Drawing Sheets

VEHICLE HEADING VALIDATION USING INERTIAL MEASUREMENT UNIT

BACKGROUND

1. Field of Disclosure

The disclosure generally relates to an inertial navigation system for determining a vehicle's heading, and more specifically to detecting the vehicle reverse motion and verifying vehicle's heading when vehicle is travelling in forward direction.

2. Description of the Related Art

Determination of accurate vehicle heading (i.e., the direction in which the vehicle is currently facing) can be critical in certain vehicles like military vehicles with mounted launchers. For example, to direct a launcher for launching a projectile in the direction of the vehicle's heading, the vehicle's heading should be determined. However, a compass may not be useful in detecting the heading as the metallic body of the vehicle may interfere with the compass' proper functioning. A Global Navigation Satellite System (GNSS) receiver may provide a heading for such vehicles, but the heading may not be accurate. For example, the GNSS receiver may incorrectly determine a vehicle moving in reverse gear as having a heading in the direction of the vehicle's reverse motion.

SUMMARY

Embodiments relate to determining and verifying a vehicle's heading based on input from a GNSS receiver and an inertial measurement unit of a navigation system. The navigation system determines a GNSS heading based on data received from the GNSS receiver and an inertial heading based on data received from the inertial measurement unit. The navigation system compares the two headings. If the two headings differ from each other by more than a threshold amount, the navigation system selects the inertial heading as the vehicle's heading. If the two headings do not differ by more than the threshold amount, the navigation system selects either of the headings as the vehicle's heading.

The navigation system repeatedly determines a GNSS heading for the vehicle based on GNSS data received from the GNSS receiver, and repeatedly determines an inertial heading for the vehicle based on data received from an inertial measurement unit. The inertial heading is determined using a recursive feedback algorithm that takes its output inertial heading as an input among other inputs that indicate the vehicle's acceleration or angular displacement. The feedback algorithm, however, may magnify any deviations in calculation of the inertial heading as the deviating inertial measurements are repeatedly provided as input to the feedback algorithm. To avoid this deviation, the inertial heading is repeatedly set to a verified GNSS heading and then provide as input to the recursive feedback algorithm. The navigation system verifies the GNSS heading if the vehicle's velocity is above a threshold velocity for a threshold amount of time. Once set to the verified GNSS heading, the inertial heading updated through the feedback algorithm is reliable. The navigation system therefore compares subsequently determined GNSS headings with the reliable inertial heading. If the two headings differ by more than a threshold amount, the navigation system determines that the GNSS heading indicates the direction of reverse motion of the vehicle instead of the vehicle's heading. The navigation system therefore corrects and validates the GNSS heading by setting it to the inertial heading. The validated GNSS heading is the vehicle's heading.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

Figure 1:
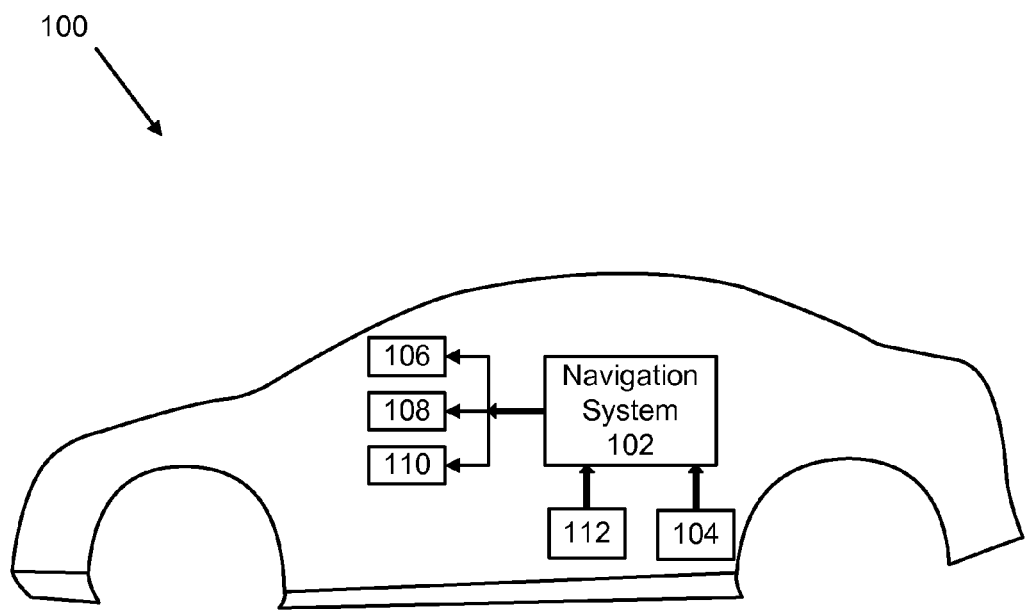
FIG. 1 is a block diagram of a vehicle including a navigation system according to one embodiment.

The computing environment described herein enables user specific feed recommendations. The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Overview of Disclosure

A vehicle's heading based on data from a GNSS receiver alone may not be accurate because the heading of the vehicle as determined by the data from the GNSS receiver may indicate a reverse direction of the heading if the vehicle is moving backwards. The navigation system described herein therefore determines two headings for the vehicle: a GNSS heading and an inertial heading. The navigation system repeatedly determines a GNSS heading for the vehicle based on GNSS data received from the GNSS receiver, and repeatedly determines an inertial heading for the vehicle based on data received from an inertial measurement unit. The heading determination has two phases, namely before inertial heading initialization and after inertial heading initialization. Before inertial heading initialization, the measurements from inertial sensors are used to determine vehicle forward/reverse motion and GNSS measurements are used to determine the direction of vehicle motion. The heading of the vehicle is determined by both of the measurements. The navigation system initializes the inertial heading to a verified GNSS heading and then provides the set inertial heading along with GNSS heading as input to a recursive feedback algorithm. The recursive feedback algorithm receives additional inputs indicating the vehicle's angular displacement or acceleration and outputs an updated inertial heading.

After inertial heading initialization, the navigation system compares the two headings computed from the inertial navigation system and the GNSS receiver, respectively. If the two headings differ by more than a threshold amount (e.g., ninety degrees), the navigation system sets the GNSS heading to the updated inertial heading (e.g. 180 degree reverse of the GNSS heading) and then uses the corrected GNSS heading to update the inertial heading. The set GNSS heading is the validated heading of the vehicle. If the two headings do not differ by the threshold amount, the navigation system, in one embodiment, directly uses the GNSS heading to update the inertial heading. In one embodiment, the updated inertial heading is the reliable estimate of the vehicle heading.

The term "inertial heading" described herein refers to the vehicle's heading as determined by an inertial navigation unit using sensor signals from inertial sensors such as gyroscopes or accelerometers. The sensor signals may be processed using a recursive feedback algorithm. Despite the recursive feedback algorithm, the inertial heading may drift over time. Hence, the inertial heading is repeatedly updated with GNSS heading and then provided as input to the feedback algorithm.

The term "GNSS heading" described herein refers to the vehicle's heading determined by the navigation system using GNSS data (including GNSS velocity) received from the GNSS receiver.

The term "repeatedly" described herein refers to repetition of events over time. The interval between the events may be fixed or be variable.

Example Architecture of System

Figure (FIG. 1 is a block diagram of a vehicle 100 including a navigation system 102 according to one embodiment. The navigation system 102 determines pose (e.g., heading) and/or location of the vehicle 100 based on available information. In one embodiment, the navigation system 102 may be part of an on-board telematics unit in the vehicle 100. The navigation system 102 is connected to an inertial measurement unit 104, a GNSS receiver 112, and optionally modules like a launcher control 106, a black box 108 and a user interface module 110. The vehicle 100 may include various other components not illustrated in FIG. 1.

The inertial measurement unit 104 determines the acceleration and angular displacement of the vehicle 100 based on signals received from inertial sensors (e.g., accelerometers and a gyroscope) and provides sensor data to the navigation system 102. The navigation system 102 uses the sensor data to determine the vehicle's inertial heading which is beneficially used, among other things, to correct errors in determination of GNSS heading, as described below with reference to FIGS. 3 and 4.

The inertial measurement unit 104 may include, among other components, accelerometers and a gyroscope. In one embodiment, the accelerometers are implemented as orthogonal solid-state accelerometers outputting analog acceleration signals. Each analog acceleration signal may indicate acceleration in the direction of one of three orthogonal axes including longitudinal acceleration along the longitudinal axis of the vehicle 100 (i.e., the axis spanning from the vehicle's rear end to the vehicle's front end). Alternatively, the accelerometers may be mounted in any orthogonal configuration and their rotation to the vehicle longitudinal axis computed. The accelerometers are, for example, microelectromechanical (MEMS) devices or optical devices or conventional mechanical devices. The analog acceleration signal from the accelerometers is converted to digital acceleration data and transmitted to the navigation system 102. The gyroscope generates angular rate data by sensing the rate of change in the angular displacement about each of three orthogonal axes. The gyroscope transmits the generated rate data to the navigation system 102.

The GNSS receiver 112 generates GNSS data based on signals received from a satellite system like Global Positioning System or Global Navigation Satellite System. The GNSS data may include, among other data, the global coordinate of the vehicle and the velocity of the vehicle's groundtrack (also known as the "GNSS horizontal velocity") derived from the changes in the global coordinate over time. The GNSS receiver 112 includes, among other components, a GNSS antenna (not shown) for receiving the GNSS signals from satellites and a GNSS processing circuitry (not shown) for processing the received GNSS signals. The GNSS processing circuitry includes a processor and memory, which in conjunction, process the GNSS signals to generate GNSS data, as well known in the art. The GNSS receiver 112 transmits the generated GNSS data to the navigation system 102.

The navigation system 102 repeatedly determines a GNSS heading based on the received GNSS data and repeatedly validates if the determined GNSS heading is the actual heading of the vehicle and not merely the direction of the vehicle's reverse motion. To determine the GNSS heading, the navigation system 102 receives the GNSS data and determines if the magnitude of the GNSS horizontal velocity is above a heading velocity threshold (e.g., above 1 meter per second). If the magnitude of the GNSS horizontal velocity is above the heading velocity threshold, the navigation system 102 sets the GNSS heading to the direction of the GNSS horizontal velocity if the longitudinal acceleration confirms the vehicle motion is forward (i.e. the direction of longitudinal acceleration is the same as the direction of the GNSS horizontal velocity). If the longitudinal acceleration indicates that the vehicle's motion is reverse, the navigation system 102 sets the GNSS heading to the 180 degree opposite of the GNSS horizontal velocity.

To validate the GNSS heading, the navigation system 102 repeatedly receives rate data and acceleration data from the inertial measurement unit 104 and repeatedly determines the vehicle's inertial heading based on the received data. The method for determining the inertial heading is described below with reference to FIGS. 3 and 4. In one embodiment, as described below with reference to FIGS. 3 and 4, the navigation system 102 also adjusts the determined inertial heading to account for any inaccuracies caused by the biases of the inertial measurement unit 104. The navigation system 102 determines if the GNSS heading is different from the inertial heading by more than a threshold amount. In one embodiment, the threshold amount is ninety degrees. If the two headings do not differ by more than the threshold amount, the GNSS heading is validated. If the two headings do differ more than the threshold amount, the navigation system 102 determines that the GNSS heading indicates the direction of the vehicle's reverse motion that may be opposite to the vehicle's heading. The navigation system 102, therefore, corrects and validates the GNSS heading by setting the GNSS heading to the inertial heading or 180 degree opposite of the GNSS heading. The inertial heading is repeatedly determined and used to validate the repeatedly determined GNSS heading. In this manner, the navigation system 102 beneficially validates the vehicle's GNSS heading based on data from the inertial measurement unit 104. Additional details about the navigation system 102, determination of GNSS heading and inertial heading are described below in detail with reference to FIGS. 2 through 4.

The validated GNSS heading is transmitted to optional modules like launcher control 106, black box 108 and user interface module 110. The launcher control 106 directs the rotation and firing of a launcher mounted on the vehicle 100 and the launcher control 106 verifies the vehicle's heading based on the validated GNSS heading. The validated GNSS heading beneficially ensures that the launcher is pointing in the correct direction before the launcher is fired. The black box 108 stores the validated GNSS heading into a log and maintains the log for later retrieval if needed. The user interface module 110 displays the validated GNSS heading on a user interface to an operator of the vehicle. The displayed heading enables the operator to navigate the vehicle or use the validated GNSS heading for other purposes.

Figure 2:
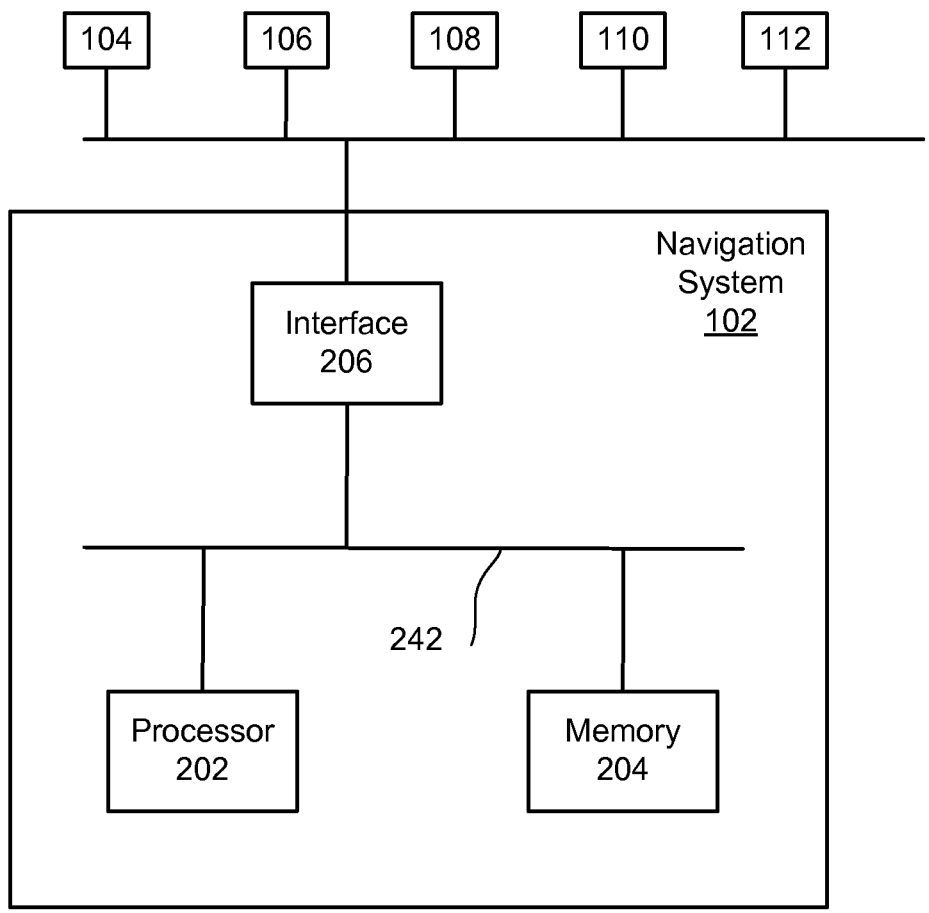
FIG. 2 is a block diagram illustrating the architecture of the navigation system according to one embodiment.

FIG. 2 is a block diagram illustrating the architecture of the navigation system 102 according to one embodiment. The navigation system 102 may be any computing device that is capable of storing and processing data. The navigation system 102 may include, among other components, an interface module 206, a memory 204, a processor 202 and a bus 242 enabling communication between these components. The navigation system 102 may include other elements not illustrated in FIG. 2.

The interface module 206 is a hardware component or a combination of software and hardware components that allow the navigation system 102 to communicate with inertial measurement unit 104, turret control 106, black box 108, user interface module 110 and GNSS receiver 112. In one embodiment, the interface module 206 communicates with other components via Assembly Line Diagnostic Link (ALDL), OBD-II, EOBD or other communication protocols.

The memory 204 stores one or more code modules for storing and processing data received from the inertial measurement unit 104 and the GNSS receiver 112, as described below in detail with reference to FIGS. 3 and 4. The memory 204 may be embodied as a computer readable storage medium including, among others, RAM (Random Access Memory). The processor 202 executes instructions as included in the code modules of the memory 204 to perform various operations.

The processor 150 reads instructions and data stored in the memory 204 via the bus 242 to perform various operations. The processor 150 may comprise various computing architectures such as a complex instruction set computer (CISC) architecture, a reduced instruction set computer (RISC) architecture, or an architecture implementing a combination of instruction sets. Although only a single processor is shown in FIG. 2, multiple processors may be included in the navigation system 102. The processor 150 may comprise an arithmetic logic unit, a microprocessor, a general purpose computer, or some other information appliance equipped to transmit, receive and process data from the memory 204.

Figure 3:
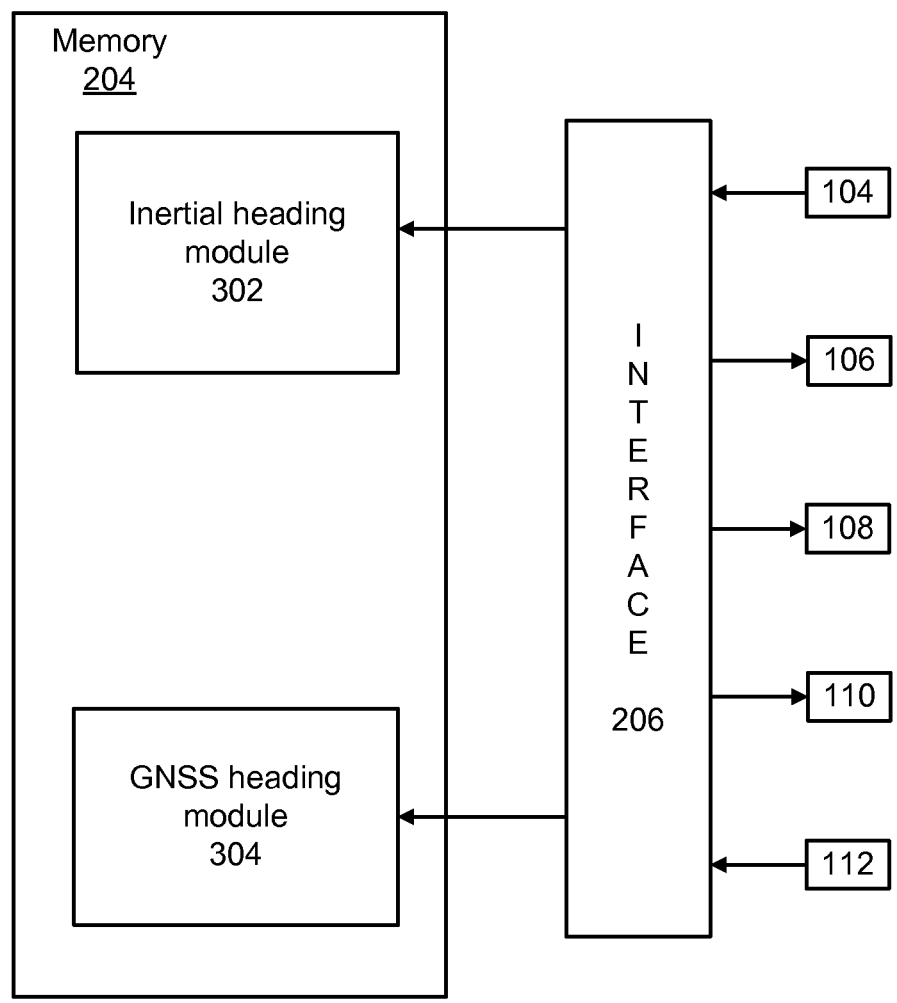
FIG. 3 is a block diagram of software components stored in the memory of the navigation system according to one embodiment.

FIG. 3 is a block diagram of software components stored in the memory 204 of the navigation system 102, according to one embodiment. These software components include an inertial heading module 302 and a GNSS heading module 304. These modules 302, 304 are stored in the memory 204 and are communicatively coupled to the inertial measurement unit 104, turret control 106, black box 108, user interface module 110 and GNSS receiver 112 through an interface 206.

The inertial heading module 302 applies a recursive feedback algorithm (e.g., the Kalman filter) to determine the inertial heading based on rate data and acceleration data received from the inertial measurement unit 104 and based on additional inputs described in additional description of the inertial heading module 302 below. The determined inertial heading is then corrected to account for errors that may be introduced by variables like biases associated with the accelerometers and the gyroscope in the inertial measurement unit 104. The corrected inertial heading is used by the GNSS heading module 304 to correct any deviations in the GNSS heading as described with reference to the GNSS heading module 304 below.

To determine the inertial heading, the inertial heading module 302 initializes the inertial heading to a heading stored in a non-volatile memory and updates the initialized inertial heading using the recursive feedback algorithm. The initialized inertial heading is provided as an input to the recursive feedback algorithm for repeatedly updating the inertial heading. The recursive feedback algorithm receives additional inputs like rate data, acceleration data and the biases of the inertial measurement unit 112 (e.g., biases caused by the accelerometers and the gyroscope). Based on the received inputs, the recursive feedback algorithm repeatedly computes an updated inertial heading.

The inertial heading module 302 also corrects potential errors caused by biases of the inertial measurement unit 112 by repeatedly receiving a verified GNSS heading from the GNSS heading module 306 and updating or re-initializing the inertial heading with the verified GNSS heading. The verified GNSS heading is described in further detail below in description of the GNSS heading module 304. After initialization to the verified GNSS heading, the inertial heading is deemed reliable until a reset time period (e.g., one hour) has elapsed since the setting. Until then, the set inertial heading is updated through the feedback algorithm and used by the GNSS heading module 304 to correct future deviations in the GNSS headings, as described below in description of the GNSS heading module 304.

After the reset time period elapses, the inertial heading module 302 again receives the verified GNSS heading and initializes the inertial heading to the verified GNSS heading. This setting corrects any errors that may have been caused by the biases since the previous setting. Left unchecked, the biases may create a deviation in the resulting inertial heading and the deviation may be magnified due to the feedback loop of the recursive algorithm (that takes the resulting inertial heading as an input). In this manner, the inertial heading is repeatedly determined and corrected for potential errors while the vehicle 100 is in a mobile state.

In one embodiment, the inertial heading module 302 repeatedly stores the updated inertial heading into a non-volatile memory in the vehicle 100. The stored inertial heading is used to initialize the initial heading when the vehicle 100 powers on or stops for an amount of time (e.g., when the vehicle is parked) and then starts moving again. To determine if the vehicle 100 has transitioned from a mobile state to a stationary state, the inertial heading module 302 repeatedly monitors the GNSS horizontal velocity. If GNSS horizontal velocity falls and stays below a stationary velocity threshold (e.g., 0.5 meters per second) for a stationary threshold amount of time (e.g., half a second), the inertial heading module 302 determines that the vehicle 100 has transitioned into the stationary state. The inertial heading module 302 then repeatedly stores the current inertial heading into the non-volatile memory. In one embodiment, the inertial heading module 302 repeatedly stores the updated inertial heading into non-volatile memory regardless of the mobile state of the vehicle 100.

After the inertial heading module 302 determines that the vehicle 100 has a verified heading, the inertial heading module 302 repeatedly stores the inertial heading. Such storage of inertial heading to non-volatile memory beneficially allows the inertial heading module 302 to determine the heading of the vehicle 100 in which the vehicle 100 was previously parked and switched off. Accordingly, when the vehicle 100 is switched on again, the inertial heading module 302 determines the vehicle's heading as the latest stored inertial heading and initializes the inertial heading to the stored heading.

The GNSS heading module 304 repeatedly determines, verifies and validates the GNSS heading. The GNSS heading module 304 determines the direction of the vehicle's motion based on the GNSS data and sets the GNSS heading to the determined direction. To set the GNSS heading, the GNSS heading module 304 determines if the magnitude of the GNSS horizontal velocity is above the heading velocity threshold. If the magnitude of the GNSS horizontal velocity is above the heading velocity threshold, the GNSS heading module 304 sets the GNSS heading to the direction of the GNSS horizontal velocity if the longitudinal acceleration confirms the vehicle motion is forward (i.e. the direction of longitudinal acceleration is the same as the direction of the GNSS horizontal velocity).

Additionally, the GNSS heading module 304 verifies the set GNSS heading to ensure that the set GNSS heading does not indicate the direction of the vehicle's reverse motion and instead indicates the vehicle's forward motion. The GNSS heading module 304, therefore, determines if the GNSS heading has remained the same for a heading verification threshold amount of time (e.g., thirty seconds) and the vehicle 100 has been moving in that heading with a GNSS velocity beyond a heading verification threshold velocity (e.g., five meters per second) for the heading verification threshold amount of time. If the GNSS heading has remained the same for the heading verification threshold amount of time and the vehicle 100 has been moving in that heading with a GNSS velocity beyond the heading verification threshold velocity for the heading verification amount of time, the GNSS heading module 304 determines the GNSS heading as verified.

Again, the verified GNSS heading is used by the inertial heading module 302 to correct deviations in the inertial heading. After correcting the inertial heading, the inertial heading is repeatedly updated through the recursive feedback algorithm, as described in description of the inertial heading module 302 above.

The GNSS heading module 304 repeatedly compares this updated inertial heading with the determined GNSS heading to correct any errors in the GNSS heading. After comparing, if the GNSS heading module 304 determines that the GNSS heading and the updated inertial heading differ by more than a threshold amount, the GNSS heading module 304 determines that the GNSS heading is the direction of the reverse motion of the vehicle 100. The GNSS heading module 304 therefore sets the GNSS heading to the updated inertial heading or to the 180 degree reverse of the GNSS groundtrack. If the headings do not differ from each other by more than the threshold amount, the GNSS heading module 304 does not change the GNSS heading, and the unchanged GNSS heading is the validated heading of the vehicle 100.

Figure 4:
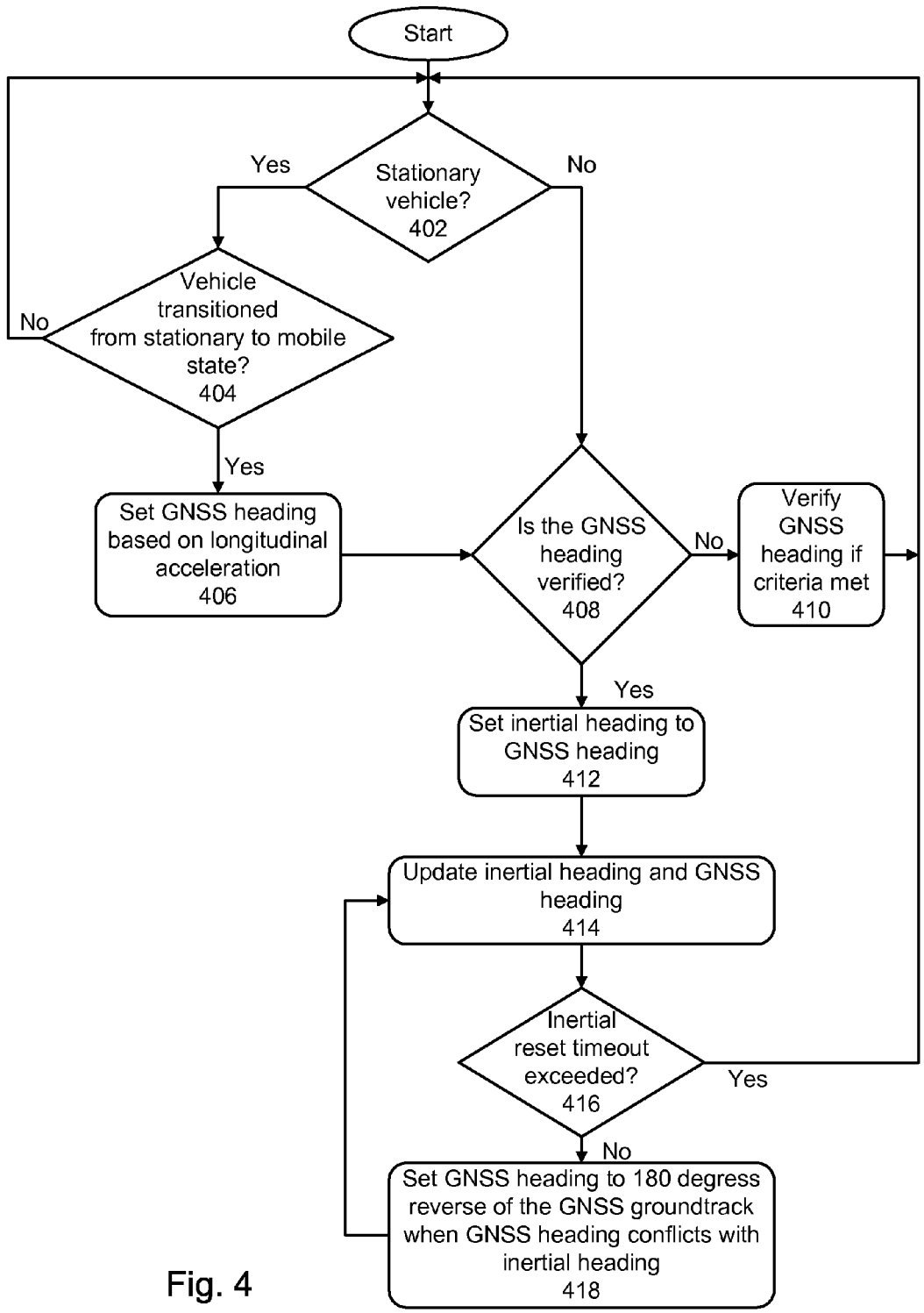
FIG. 4 is a flow chart illustrating a method for determining the vehicle's heading according to one embodiment.

FIG. 4 is a flow chart illustrating a method for determining the vehicle's heading, according to one embodiment. Initially, the vehicle 100 is stationary and then turned on. After the vehicle 100 is turned on, the inertial heading module 302 monitors the GNSS horizontal velocity and determines 402 if the vehicle 100 is stationary. If the vehicle 100 is not stationary, step 408 is implemented as described in additional description of FIG. 4 below. If the vehicle is stationary, the inertial heading module 302 determines 404 if the vehicle has started moving. If the vehicle has not started moving, the inertial heading module repeats step 402 through 404. If the vehicle has started moving, the inertial heading module 302 sets 406 the GNSS heading based on longitudinal acceleration. In one embodiment, in step 406, the GNSS heading is set and the direction of initial vehicle motion is saved based on direction of the longitudinal acceleration. After the GNSS heading is set, the inertial heading module 302 determines 408 if the GNSS heading of the vehicle has been verified by the GNSS heading module 304. If the GNSS heading has not been verified, the GNSS heading module verifies 410 the GNSS heading if the GNSS heading's verification criteria is met. Steps 402-410 are repeated until the GNSS heading is verified.

If the GNSS heading is verified, the inertial heading module 302 sets 412 the inertial heading to the verified GNSS heading, provides the updated inertial heading to the recursive feedback algorithm and repeatedly updates 414 the inertial heading. Additionally, the inertial heading module 302 tracks the amount of time elapsed since the inertial heading was set in step 412. If the inertial heading module 302 determines 416 that a reset time period has elapsed since the setting, the inertial heading module 302 determines that the inertial heading is not reliable anymore because of the inaccuracies introduced by the biases of the inertial measurement unit 104. Accordingly, if the reset timeout has elapsed, steps 402 through 416 are repeated. If the inertial heading module 302 determines 416 that a reset time period has not elapsed since the setting, the inertial heading is determined reliable and can be used to correct the GNSS heading. Accordingly, while the inertial heading is reliable, the GNSS heading module 304 repeatedly determines and compares the GNSS heading to the repeatedly updated inertial heading and if the two headings differ by more than a threshold amount, the GNSS heading module 304 sets 418 the GNSS heading to the inertial or 180 degrees reverse of the GNSS groundtrack. The GNSS heading resulting from step 418 is the validated heading of the vehicle 100.

In this manner, the inertial heading module 302 and the GNSS heading module 304 in the navigation system 102 beneficially process the inertial heading and GNSS heading to determine a validated heading for the vehicle 100. In some embodiments, the inertial heading is not repeatedly determined by the inertial heading module 302. In other embodiment, the GNSS heading is not repeatedly determined by the GNSS heading module 304. Similarly, in some embodiments, the GNSS heading is not repeatedly set to the verified GNSS heading.

In some embodiments, the inertial heading module 302 and the GNSS heading module 304 implement the steps 402 through 418 serially. In another embodiment, the modules 302, 304 perform various steps illustrated in FIG. 4 in parallel. For example, the inertial heading module 302 and the GNSS heading module 304 perform their steps on two different threads or two parallel processes. On one thread, steps 402 through 408, step 412, updating the inertial heading in step 414, and step 416 is performed by the inertial heading module 302. On another thread, step 410, updating the GNSS heading in step 414, step 416 and step 418 are performed by the GNSS heading module. Because the check in 416 is needed to determine when to reset the inertial heading and to determine if the inertial heading can be used to set the GNSS heading, step 416 is performed by both the inertial heading module 302 and the GNSS heading module 304.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method for determining a validated heading of a vehicle, the method comprising:
   determining a first heading of the vehicle by processing a signal received from an inertial measurement unit;

determining a second heading of the vehicle by processing a signal received from a Global Navigation Satellite System (GNSS) receiver;

determining if the first heading and the second heading differ from each other by more than a threshold amount;

responsive to determining that the first heading and the second heading differ by more than the threshold amount, selecting the first heading as the validated heading of the vehicle; and responsive to determining that the first heading and the second heading do not differ by more than the threshold amount, selecting the first heading or the second heading as the validated heading of the vehicle.

2. The computer-implemented method of claim 1, further comprising:

responsive to determining that the determined second heading has not changed for a threshold amount of time, marking the second heading as a verified second heading; and wherein the first heading is determined based on a previous first heading which was set to the verified second heading.

3. The computer-implemented method of claim 1, further comprising:

responsive to determining that the vehicle has accelerated beyond a threshold in direction of the second heading, marking the second heading as a verified second heading; and wherein the first heading is determined based on a previous first heading which was set to the verified second heading.

4. The computer-implemented method of claim 1, wherein determining the first heading comprises:

providing a current first heading to a recursive feedback algorithm as input; and updating the first heading by setting the first heading to output of the feedback recursive algorithm.

5. The computer-implemented method of claim 1, wherein the threshold amount is ninety degrees.

6. The computer-implemented method of claim 1, wherein determining a first heading of the vehicle comprises:

determining a longitudinal acceleration along a longitudinal axis of the vehicle; and initializing the first heading to a direction of the determined longitudinal acceleration.

7. The computer-implemented method of claim 1, wherein determining the first heading of the vehicle comprises:

responsive to determining that the vehicle has transitioned from a stationary state to a mobile state, retrieving a stored value for the first heading from a non-volatile memory in the vehicle, and initializing the first heading to the retrieved value.

8. The computer-implemented method of claim 1, further comprising:

responsive to determining that the first heading and the second heading differ by more than the threshold amount, setting the second heading to the first heading.

9. The computer-implemented method of claim 1, wherein the steps of determining the first heading and of determining the second heading are performed repeatedly.

10. The computer-implemented method of claim 1, wherein the steps of determining the first heading and of determining the second heading are performed in parallel.

11. A non-transitory computer readable storage medium structured to store instructions for determining a validated heading of a vehicle, the instructions when executed by a processor cause the processor to:

determine a first heading of the vehicle by processing a signal received from an inertial measurement unit;

determine a second heading of the vehicle by processing a signal received from a Global Navigation Satellite System (GNSS) receiver;

determine if the first heading and the second heading differ from each other by more than a threshold amount;

responsive to determining that the first heading and the second heading differ by more than the threshold amount, select the first heading as the validated heading of the vehicle; and responsive to determining that the first heading and the second heading do not differ by more than the threshold amount, select the first heading or the second heading as the validated heading of the vehicle.

12. A navigation system for determining a validated heading of a vehicle, comprising:

an inertial heading module configured to determine a first heading of the vehicle by processing a signal received from an inertial measurement unit; and a Global Navigation Satellite System (GNSS) module configured to:

determine a second heading of the vehicle by processing a signal received from a GNSS receiver, determine if the first heading and the second heading differ from each other by more than a threshold amount, select the first heading as the validated heading of the vehicle responsive to determining that the first heading and the second heading differ by more than the threshold amount, and select the first heading or the second heading as the validated heading of the vehicle responsive to determining that the first heading and the second heading do not differ by more than the threshold amount.

13. The navigation system of claim 12, wherein the GNSS module is further configured to:

mark the second heading as a verified second heading responsive to determining that the determined second heading has not changed for a threshold amount of time; and wherein the first heading is determined based on a previous first heading which was set to the verified second heading.

14. The navigation system of claim 12, wherein the GNSS module is further configured to:

mark the second heading as a verified second heading responsive to determining that the vehicle has accelerated beyond a threshold in direction of the second heading; and wherein the first heading is determined based on a previous first heading which was set to the verified second heading.

15. The navigation system of claim 12, wherein the inertial heading module is configured to determine the first heading by:

providing a current first heading to a recursive feedback algorithm as input; and updating the first heading by setting the first heading to output of the feedback recursive algorithm.

16. The navigation system of claim 12, wherein the threshold amount is ninety degrees.

17. The navigation system of claim 12, wherein the inertial heading module is configured to determine the first heading by:

determining a longitudinal acceleration along a longitudinal axis of the vehicle; and initializing the first heading to a direction of the determined longitudinal acceleration.

18. The navigation system of claim 12, wherein the inertial heading module is configured to determine the first heading by:
responsive to determining that the vehicle has transitioned from a stationary state to a mobile state, retrieving a stored value for the first heading from a non-volatile memory in the vehicle, and initializing the first heading to the retrieved value.

19. The navigation system of claim 12, wherein the GNSS module is further configured to:
set the second heading to the first heading responsive to determining that the first heading and the second heading differ by more than the threshold amount.

20. The navigation system of claim 12, wherein the first heading and the second heading are repeatedly determined.

* * * * *